April 9, 1946.  H. M. KERFOOT  2,398,146
MACHINE FOR FORMING TABLETS OR OTHER ARTICLES
FROM POWDERED MATERIAL BY COMPRESSION
Filed Sept. 18, 1944  6 Sheets-Sheet 6

INVENTOR.

ATTORNEYS

Patented Apr. 9, 1946

2,398,146

UNITED STATES PATENT OFFICE 2,398,146

MACHINE FOR FORMING TABLETS OR OTHER ARTICLES FROM POWDERED MATERIAL BY COMPRESSION

Henry Manners Kerfoot, Fairfield, Buxton, England

Application September 18, 1944, Serial No. 554,702
In Great Britain September 24, 1943

8 Claims. (Cl. 18—16)

This invention relates to improvements in machines for forming articles from powdered material by compression.

In one known form of machine for making tablets a single hole or a single row of holes is formed in a die and a pair of plungers enter each hole to compress the material between them and eject the compressed tablet from the top of the hole on the completion of the pressing operation. In this form of machine the lower position of the bottom plunger is adjustable so that the quantity of powder inserted into the hole can be varied according to the weight desired of the finished tablet and the powder is delivered to the hole or holes from a reciprocating frame sliding over the top of the die, which frame or a projection thereon also serves to push the finished tablet or tablets off the die into a delivery chute or a suitable receiving receptacle.

In another known form of machine, also for making tablets, a ring of holes is formed near the periphery of a rotating disc or annulus above and below which two further rings also rotate at the same speed. The under ring carries an equal number of plungers to the holes in the central ring or disc, the lower ends of the plungers sliding over a fixed surface with a rise or cam at a point thereon so that when the head of each plunger engages the rise or cam it is forced upwards in its hole. The upper ring also carries the same number of plungers the upper ends of which pass through a circular groove in a fixed plate, the heads of the plungers being in contact with the upper surface of the plate at the sides of the groove. A depression is formed in the plate at a point corresponding to the rise on the lower fixed surface and above this depression a device such as a wheel or disc is located at a distance from the plate substantially equal to the thickness of the head of the plunger. Thus when each top plunger arrives at the point where the depression is formed in the plate it is forced downwards by the wheel or disc and caused to enter the corresponding hole in the die ring to compress the powder therein between it and the lower plunger. The powdered material is supplied to the holes by a stationary frame below which the die ring rotates, the frame preferably extending over two or more holes and being divided into a corresponding number of compartments.

The object of the present invention is a machine which while having a relatively slow speed of compression of the articles will have a greater output than that of known machines, which is simple in construction, easy to clean when changing over from one material to another and which will deliver at intervals depending on the speed of machine a predetermined number of tablets, preferably the number or a sub-multiple of the number of the articles which it is desired to pack into a container therefore.

The machine according to the present invention comprises a reciprocating die, preferably rectangular in shape, formed with a number of rows of holes, a reciprocating carriage carrying the die, a stationary feed frame below which the carriage reciprocates and which is arranged in such a position that the die is below it when the carriage is in its mid-position between the two extremes of its travel, a pair of rams, one arranged above the position occupied by the die when the carriage is at one end of its travel and the other above the position occupied by the die when the carriage is at the other end of its travel, a plurality of plungers carried by each ram to enter the holes in the die, means for depressing the ram at one end of the travel of the carriage when the die is stationary below it, means for depressing the ram at the other end of the travel of the carriage when the die is stationary below it, a single set of lower plungers adapted to reciprocate with the die, a surface with which the lower ends of the plungers are in contact and over which they slide as the die reciprocates, and means for raising the surface to raise the lower plungers from the holes in the die after the articles have been compressed between the upper and lower plungers and the upper plungers have been withdrawn from the holes to eject the articles therefrom.

The invention is illustrated in and will be described with reference to the accompanying drawings in which a machine is shown applicable for making tablets. In these drawings.

Figure 1:
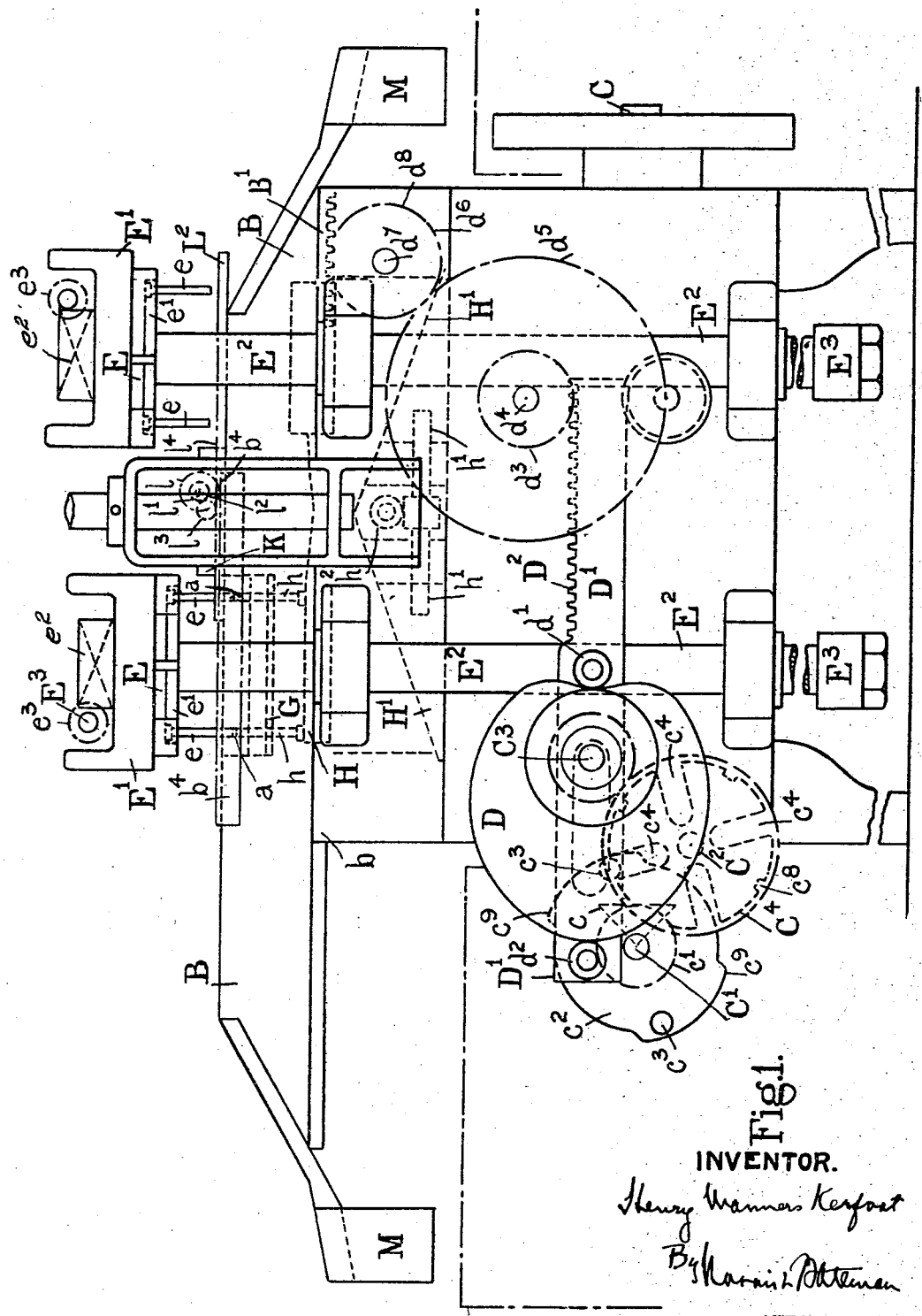
Fig. 1 is a side elevation of the machine.
Figure 2:
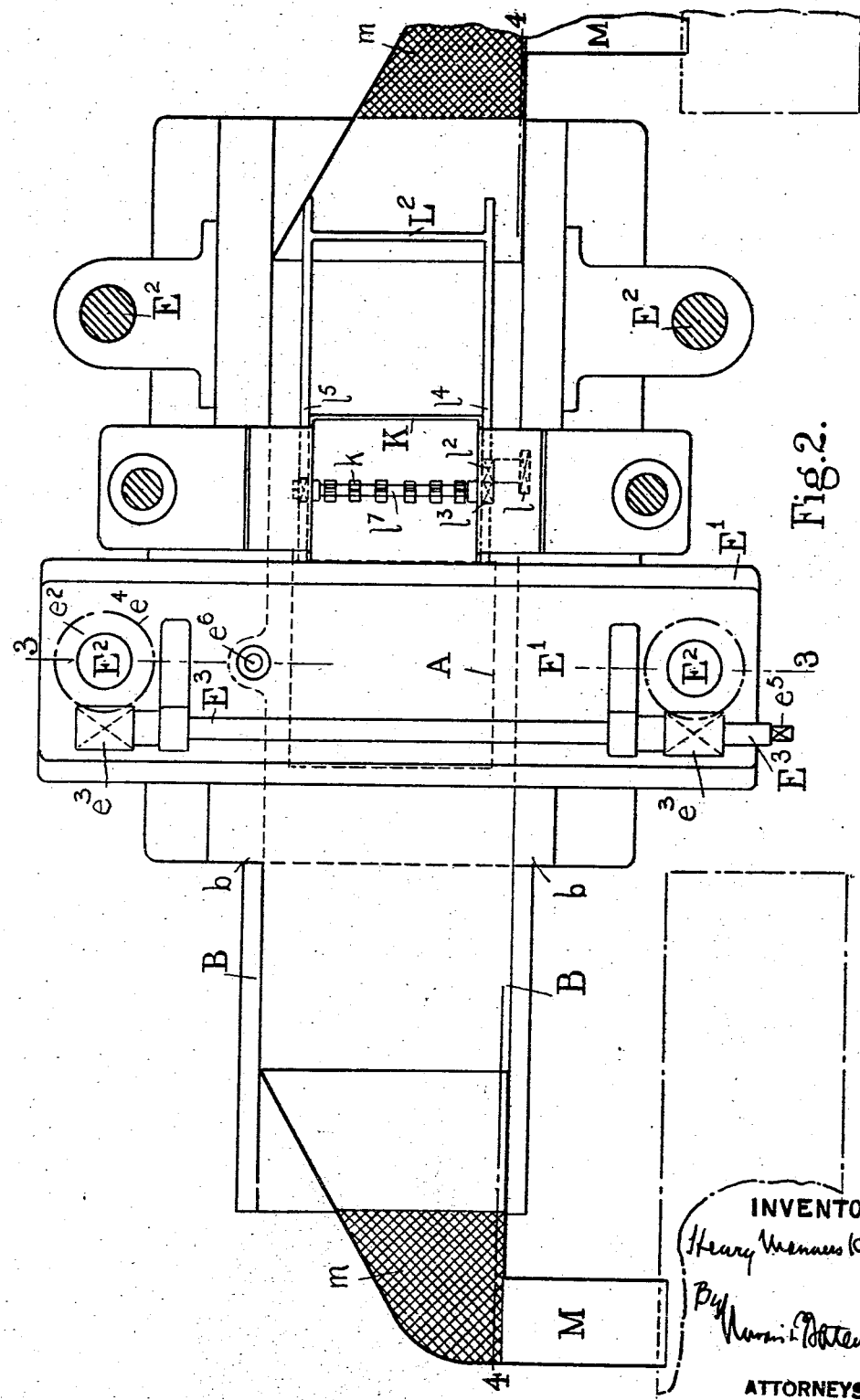
Fig. 2 is a plan thereof.
Figure 3:
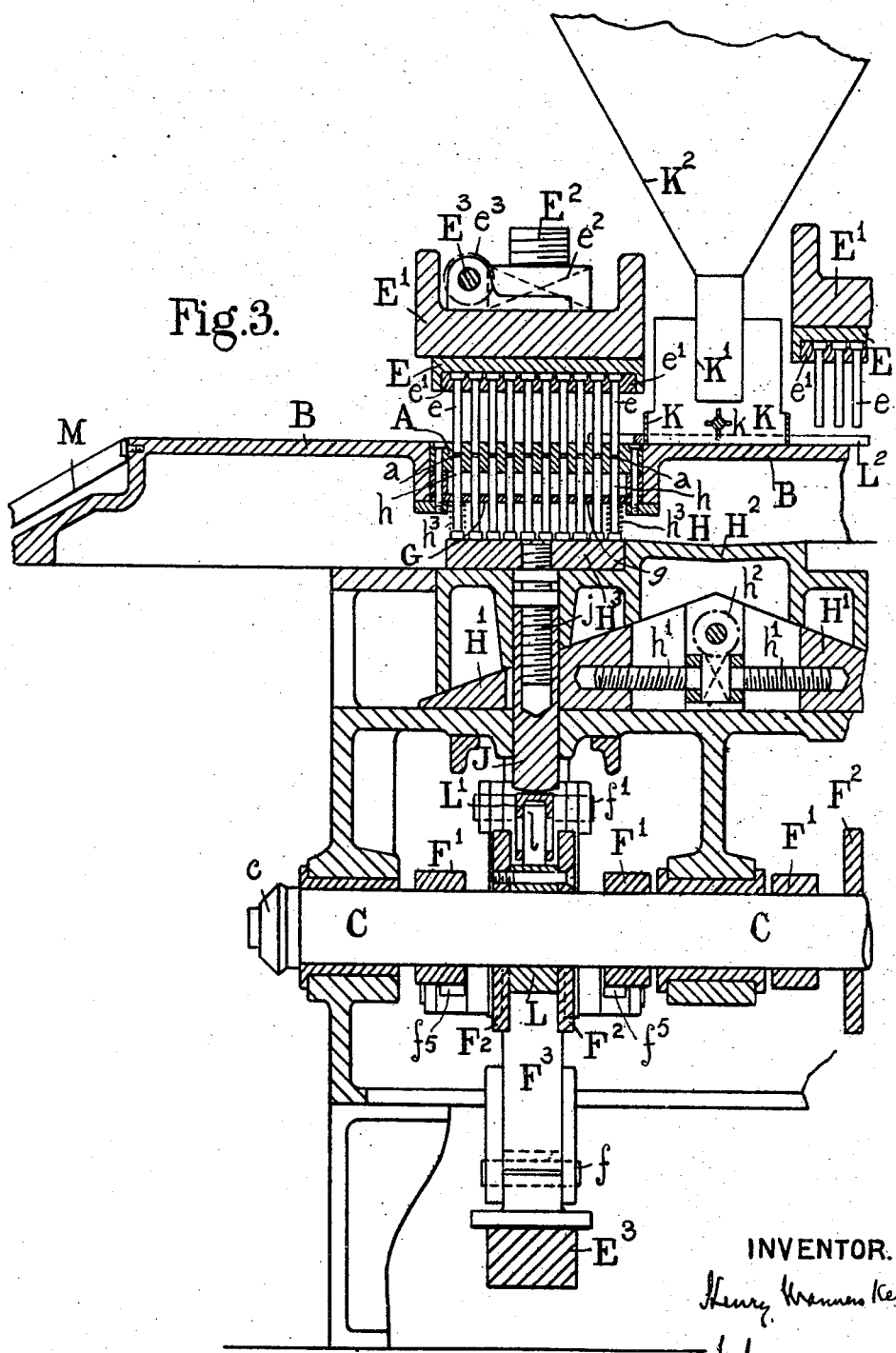
Figure 4:
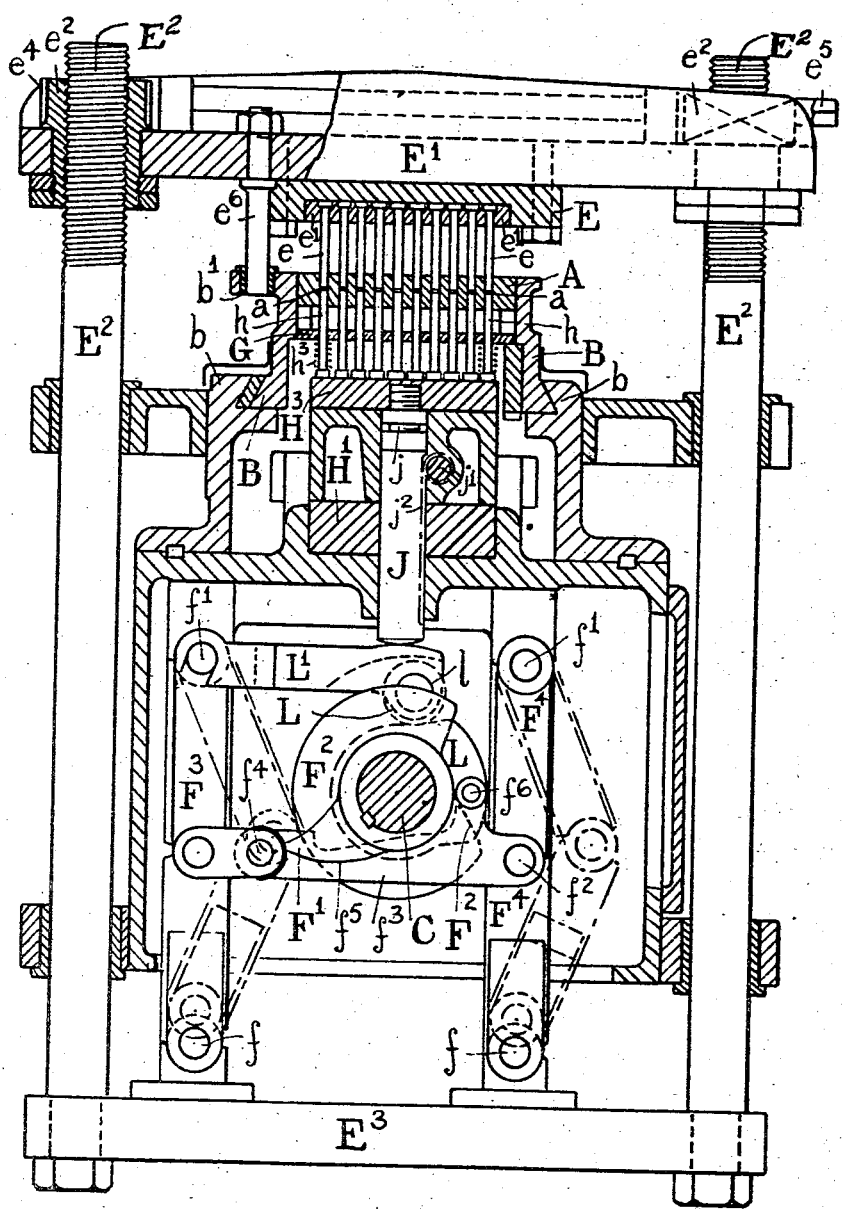
Figure 5:
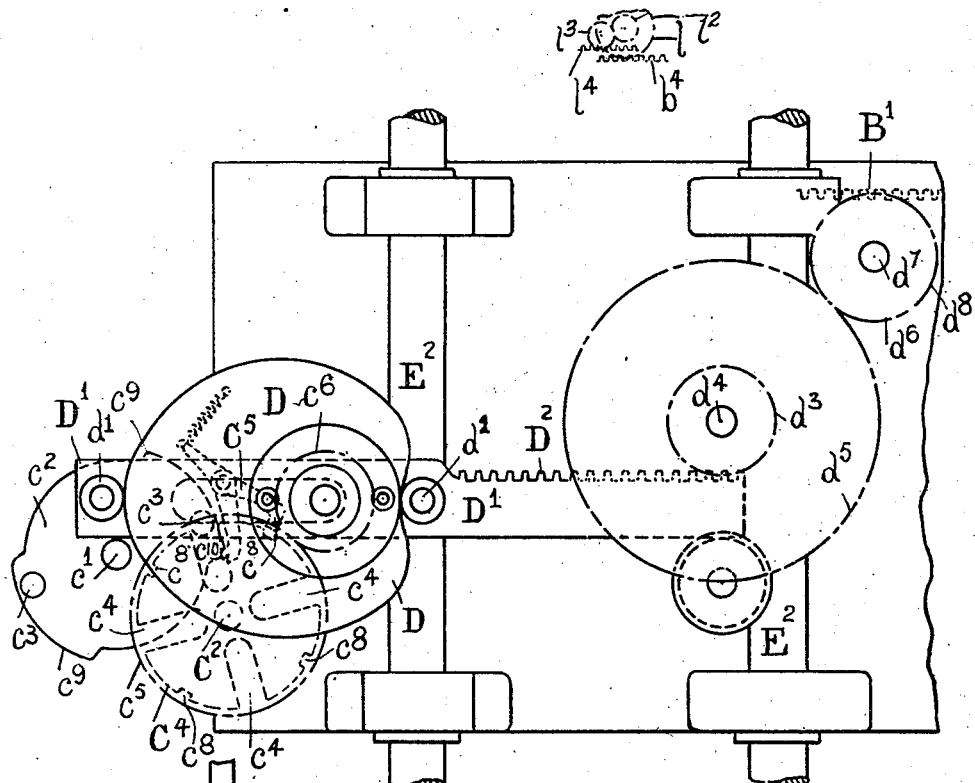
Figure 6:
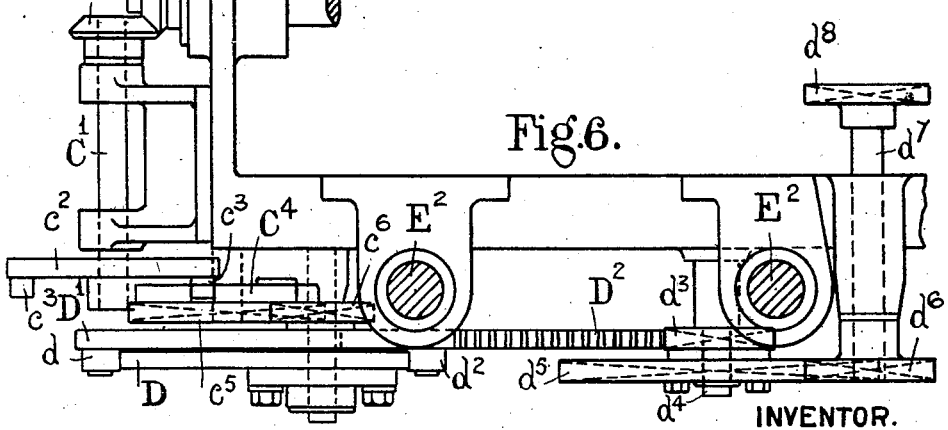
Figure 7:
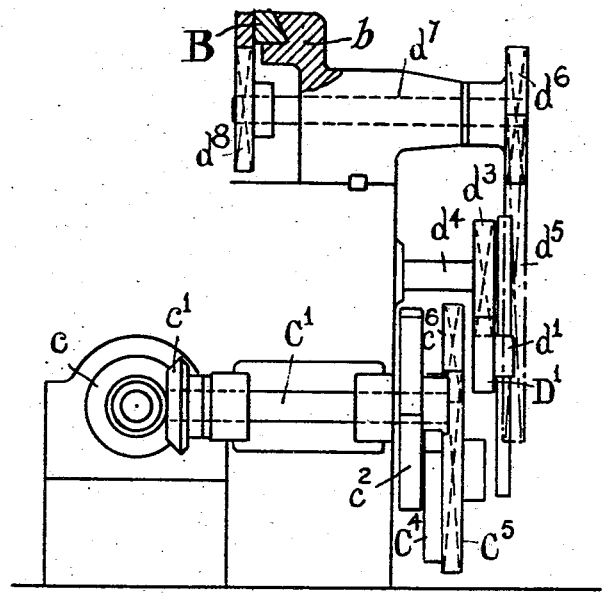
Figure 10:
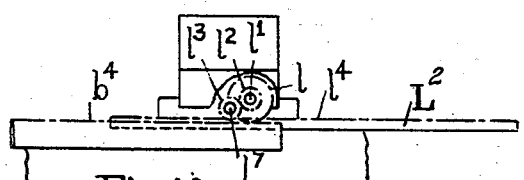
Figure 8:
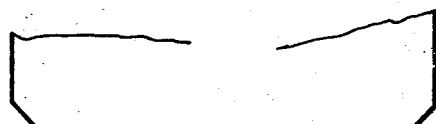
Figure 9:
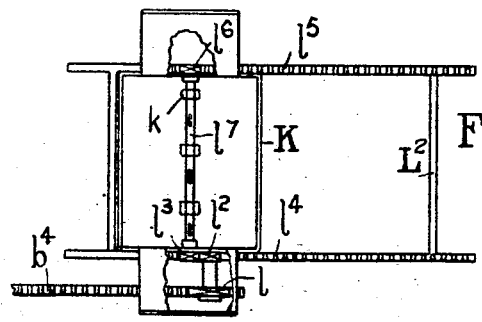

Fig. 3 is a vertical longitudinal section on line 3—3, Fig. 2, showing the left hand top ram with the die below it and a portion of the right hand ram, Fig. 4 is a transverse section on line 4—4, Fig. 2, Fig. 5 is a front elevation of the gearing by which the carriage is reciprocated, Fig. 6 is a plan thereof, Fig. 7 is a side elevation thereof, Fig. 8 is a transverse vertical section of the feed frame and hopper supplying the powdered material thereto, Fig. 9 is a horizontal section through the feed frame, also showing a reciprocating ejector for removing the compressed articles from the surface of the die, Fig. 10 is a side elevation of Fig. 9.

The die A is carried by a carriage B mounted in slides b carried by or forming part of the frame of the machine, the die being preferably arranged centrally in the carriage. The carriage B is driven so that it reciprocates in the slides b from the main shaft C of the machine through the bevel wheel c which drives the bevel wheel $c^1$ on the shaft $C^1$ to which is affixed a wheel $c^2$ carrying two diametrically opposite studs $c^3$ which alternately engage in one of the four slots $c^4$ of a Maltese wheel $C^4$ affixed on a short shaft $C^2$ parallel with the shaft $C^1$. A spin wheel $c^5$ is also affixed on the shaft $C^2$ and gears with a wheel $c^6$ on a second short shaft $C^3$ to which is secured a cam D. The Maltese wheel $C^4$ will be rotated once for every two revolutions of the wheel $c^2$, each stud $c^3$ rotating the wheel $C^4$ for a quarter of a revolution followed by a corresponding dwell until the next stud engages the following slot $c^4$ when the wheel $C^4$ is again rotated a quarter of a revolution followed by another dwell. By making the wheel $c^6$ half the diameter of the wheel $c^5$ the cam D makes one revolution for each revolution of the wheel $c^2$, each revolution being in four steps with a corresponding dwell between each, and, since the bevel wheels c and $c^1$ are of the same diameter, the cam D makes one revolution for each revoultion of the main shaft C, the revolution being divided ito two periods of rotation and two periods of dwell.

The cam D rotates between two studs $d^1$, $d^2$ on a sliding bar $D^1$, the latter making one complete to and fro movement for each revolution of the cam with a dwell at each end of the movement. A rack $D^2$ is formed on the upper face of the bar $D^1$ and engages a pinion $d^3$ mounted on a stud $d^4$ and affixed to a gear wheel $d^5$ which engages a pinion $d^6$ affixed on a shaft $d^7$ which also carries a pinion $d^8$, engaging a rack $B^1$ on the underside of the carriage B which carries the die A. The carriage B is thus reciprocated in unison with the bar $D^1$ i. e. it makes one complete to and fro movement for each to and fro movement of the bar, the ratio of the distances travelled by the carriage B and the bar $D^1$ depending on the ratio of the wheels' $d^3$, $d^5$ and $d^8$, the ratio of these wheels being such that the carriage travels to and fro the required distance to bring the die A under one of the top rams E at each end of its travel when the dwell obtained by the wheel $C^4$ occurs.

In order to prevent movement of the wheel $C^4$ (see Fig. 5), after a stud $c^3$ has disengaged itself from one of the slots $c^4$ in the wheel a spring loaded pawl $C^5$ engages one of four recesses $c^8$ in the periphery of the wheel $C^4$, the pawl being disengaged therefrom for the next movement of the wheel $C^4$ by one or other of the two cam faces $c^9$, on the periphery of the wheel $c^2$ which face engages an arm $c^{10}$ secured to the pawl $C^5$.

The die A shown in the drawings (see Figs. 3 and 4), is formed with ten rows of holes a with ten holes in each row so that at each operation one hundred tablets are formed.

Each of the rams E carries a corresponding number of plungers e, these plungers being carried by and passing through a plate $e^1$ secured to the ram. The holes in the plate $e^1$ are accurately spaced in relation to the holes a in the die A either by means of a suitable jig or by drilling the holes in the plate and die at one operation. The heads of the plungers e rest on the upper surface of the plate $e^1$ and the latter is clamped to the lower face of the ram with the plungers securely held between the plate and ram. Each ram E is carried by a cross head $E^1$ mounted on two vertical rods $E^2$ slidably mounted in the frame of the machine. The cross head is carried by a nut $e^2$ on each rod $E^2$, the nuts being capable of rotation in unison by the spindle $E^3$ which carries pinions $e^3$ gearing with teeth $e^4$ on each nut whereby the cross head $E^1$ and with it the ram E can be raised or lowered to adjust the position of the rod $E^2$ relative to the die A by rotation of the spindle $E^3$, one end $e^5$ of the latter being formed to receive an operating handle.

The vertical rods $E^2$ are lowered and raised to bring the top plungers e into and out of the holes a in the die A by the cams $F^1$ and $F^2$ on the main shaft C of the machine. These cams operate the rods through two pairs of toggles $F^3$ and $F^4$, the lower ends of which are pivotally mounted on pivots f carried by a bar $E^3$ connecting the rods $E^2$ and the upper ends on the studs $f^1$ mounted on the framing of the machine. The pivots $f^2$ connecting the two arms of each toggle together are connected by a transverse bar $f^3$ which carries a stud $f^4$ operated by the rise $f^5$ on the cam $F^1$ to straighten the toggle members, i. e. to bring them into the position shown in full lines in Fig. 4. When the toggles are in this position the vertical rods $E^2$ are pulled downwards to bring the cross head $E^1$ and ram E into their lowest position with the plungers e in the holes a in the die A. The toggles $F^3$ are moved into their bent positions i. e. the positions shown in broken lines in Fig. 4, by the cam $F^2$ which engages a second stud $f^6$ carried by the transverse bar $f^3$.

It is to be understood that there are two sets of toggles $F^3$ and $F^4$, one set for each of the rams E and that each set is operated by its own cams $F^1$ and $F^2$ on the shaft C, the cams operating each set being positioned on the shaft in diametrically opposite relation to those of the other set so that the corresponding ram E and plungers e are moved downwards when the die A is in position below them.

To ensure that the plungers e are correctly registered with the holes a in the die A when they are moved downwards a centering pin $e^6$, the lower end of which is preferably tapered is carried by the cross head $E^1$ and enters a hole $b^1$ in the carriage B and takes up any play there may be in the carriage to bring the die into correct position.

The single set of lower plungers h is also carried in a rectangular plate G reciprocating with the die A and also having the same number of vertical holes g as there are plungers h and as there are holes a in the die A. The holes g are formed to correspond exactly in position to the holes a in the die either by means of a suitable jig or by drilling the holes in the plate and die at one operation. The lower ends of the plungers h rest on a stationary platform H over which they slide as they reciprocate with the die. The upper ends of the plungers h are normally located in the holes a in the die A to a height to allow the amount of powdered material to enter the holes in the die necessary to give the required weight of each article where a predetermined weight is required, and the platform H on which they slide is capable of adjustment for the purpose of varying the depth of the plungers $h$ in the die A by means of the two inclined blocks $H^1$ operated by the left and right hand screw $h^1$ which can be rotated by the gearing $h^2$.

The platform H over which the lower ends of the plungers $h$ slide is formed in three portions, a central portion $H^2$ which is fixed and two end portions $H^3$ which are moved vertically to raise the plungers $h$ in the holes $a$ in the die A for the purpose of ejecting the finished articles from the holes after they have been compressed therein between the upper and lower plungers $e$ and $h$. A suitable coiled spring $h^3$ surrounds each plunger to withdraw it from its top to its bottom position when the end portion $H^3$ is lowered.

Each end portion $H^3$ of the platform H is affixed to a plunger J by an adjusting screw $j$ the plunger J being mounted to slide vertically in the frame of the machine. The plunger J is controlled by a cam L on the shaft C to raise the end portion $H^3$. The cam L engages a stud $l$ carried by an arm $L^1$ pivoted on the fixed pivot stud $f^1$ of the toggles $F^3$ and the lower end of the plunger J rests on the arm $L^1$.

The upper portion of the end portion $H^3$ can be adjusted by the adjusting screw $j$ to ensure the plungers ejecting the finished articles from the holes should they have been ground slightly shorter for resurfacing.

The portion $H^3$ can be further raised by the pinion $j^1$ which engages a rack $j^2$ on the plunger J for the purpose of removing the plungers together with the plate G and the die A from the machine.

The powdered material is delivered to the die A by a feed frame K arranged midway between the two rams E, the lower edges of the frame being in contact with the upper surface of the die as the latter moves under it. The powdered material is fed to the frame K by a chute $K^1$ from a hopper $K^2$, the chute $K^1$ being adjustable vertically to regulate the supply of material to the frame. Instead of a single chute two chutes may be provided one near each end of the frame K. A rotary agitator $k$ is preferably arranged below the outlet of the chute $K^1$.

A reciprocating device $L^2$ is provided to remove the finished articles from the die A after they have been ejected from the holes $a$ therein and discharge them into a delivery chute M at the end of the reciprocating carriage B. There are two delivery chutes M, one at each end of the machine, each chute being adapted to deliver all the articles compressed at that end of the machine into the receptacle into which they are to be packed.

The device $L^2$ is driven from the carriage B (see Figs. 8, 9 and 10), so that its movement is in the opposite direction to that of the carriage, as shown in Figs. 8, 9 and 10, by a rack $b^4$ on the carriage which drives a pinion $l$ on a short shaft $l^1$ to which is secured a second pinion $l^3$ gearing with the pinion $l^3$ which engages a rack $l^4$ on the device $L^2$. A second rack $l^5$ is preferably formed on the opposite side of the device $L^2$ and is driven by a pinion $l^6$ on a shaft $l^7$ rotated by the pinion $l^3$ driven by the rack $l^4$. The shaft $l^7$ is arranged below the outlet from the chute $K^1$ and carries the agitator $k$.

To prevent any powdered material scraped off the die A by the device $L^2$ passing down the chute M to the receptacle for receiving the finished articles, a sieve $m$, which may be vibrated, is arranged at a bend in the chute as shown in Fig. 2.

The operation of the various parts of the machine having been hereinbefore described in detail, the general operation of the machine is as follows: Assuming a supply of the powdered material has been placed in the hopper $K^2$, and that the main shaft C is driven continuously, the carriage B carrying the die A is reciprocated to and fro by the Maltese wheel $C^4$ and its connected gearing, with a dwell at each end of its travel. As the carriage passes the mid-point in its travel in each direction, the die A passes beneath the hopper $K^2$ and feed frame K which confines the material on the upper surface of the carriage which flows into the holes or cavities in the die and fills the portion of these holes above the lower plungers $h$, these plungers then resting on the central portion $H^2$ of the surface of the platform H. When the carriage reaches each end of its travel, the die thereon comes to rest beneath the respective ram E with the upper plungers thereon aligned with the holes in the die, and during the dwell at the respective end of travel of the carriage, the cam F' and toggles at that end of the machine operate to lower the respective ram and the plungers thereon to compress the powdered material in the holes in the die above the lower plungers $h$, the latter being then supported by the respective platform member $H^3$ on which they rest and which is then in its lower position, and the upper plungers are then raised by the cam $F^2$ which relaxes the toggles. The immediately following operation of the cam L raises the platform member $H^3$, lifting the lower plungers in the die. While the lower plungers are thus held in raised position to bring the molded tablets to the surface of the carriage, the Maltese wheel and its gearing reciprocate the carriage to carry the die beneath the supply hopper $K^2$ and feed frame members K where it receives another supply of powdered material, and is brought into position beneath the ram at the other end of the machine where it rests during the dwell in the travel of the carriage, and the ram at this end of the machine will be lowered and the lower plungers will be raised in the die to compress the material into tablets and to eject the latter from the die, as was done in the preceding operation at the opposite end of the machine. During the travel of the carriage toward each end of the machine, the device $L^2$, which is driven in the opposite direction to that of the travel of the carriage by its gearing as hereinbefore described, sweeps the molded tablets off the die and into the chute M.

Since the cams F' and $F^2$ at one end of the machine are set in diametrically opposite relation to the respective cams at the other end of the machine, the rams at the respective ends of the machine will be alternately lowered and raised during successive half revolutions of the main shaft, and during the travel of the carriage in each direction to carry the die from one end to the other end of the machine, the molded tablets will be swept from the die as it moves from one end of the machine and the die will be charged with a supply of the powdered material for the molding of the tablets at the other end of the machine. As these operations take place concurrently, a multiple number of tablets corresponding to the number of holes in the die will be molded during each half revolution of the main shaft, thus providing a large output of the machine, although enabling a relatively low speed of compression of the material to be employed.

By making the number of holes $a$ in the die A the same as the number of articles it is desired to pack in each receptacle it is not necessary to employ a separate counting mechanism as the required number will be delivered after each pressing operation. If a larger number of articles are required for each receptacle then the number of holes $a$ in the die A can be a sub-multiple of the number of articles and the receptacle retained below the chute for the necessary number of operations. Thus if the die has 100 holes and it is desired to pack 400 articles in each receptacle then the latter is kept in position for four complete to and fro movements of the die.

The top and bottom plungers $e$ and $h$ are preferably made the same shape and size so that they are interchangeable and if they are cylindrical when they become worn they can be readily turned down to make smaller plungers for use in producing articles of small diameter.

As is evident from the foregoing description all the moving parts of the machine are driven from the main shaft through suitable gears where necessary, the various cams and other actuating devices being timed to give the required sequence of operations.

The form of the machine hereinbefore described is particularly applicable for the production of medicinal or like tablets of circular shape but any other shape of tablet may be produced by forming the holes $a$ in the die A and the plungers $e$ and $h$ to correspond to such shape.

Moreover, although the machine described is particularly applicable for the formation of tablets, it can with slight variation not affecting the scope of the invention be employed for pressing other articles from powdered material such as artificial resin moulding powders.

I claim:

1. A machine for forming articles of powdered material by compression comprising a die formed with a plurality of rows of holes, a reciprocating carriage carrying the die, a stationary feed frame below which the carriage reciprocates and located so that the die is beneath it when the carriage is in its mid-position between the two extremes of its travel, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, means for depressing each of the rams alternatively when the die is stationary below it, a single set of lower plungers located in and reciprocating with the die, a surface with which the lower ends of the plungers are in contact and over which they slide as the die reciprocates, and means for raising the surface to raise the lower plungers in the die after the articles have been compressed in the holes therein between the upper and lower plungers and the upper plungers withdrawn from the holes for the purpose of ejecting the articles from the holes in the die.

2. A machine for forming articles of powdered material by compression comprising a reciprocating die formed with a plurality of rows of holes, a reciprocating carriage carrying the die, a stationary feed frame below which the carriage reciprocates and located so that the die is beneath it when the carriage is in its mid-position between the two extremes of its travel, a main driving shaft from which all parts of the machine are driven, a slotted wheel receiving intermittent motion from the main shaft, a cam rotated by the slotted wheel, a rack reciprocated by the cam, a train of gears driven by the rack and driving a second rack on the carriage, whereby the carriage is reciprocated with a dwell at each end, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, means for depressing each of the rams alternately when the die is stationary below it, a single set of lower plungers located in and reciprocating with the die, a surface with which the lower ends of the plungers are in contact and over which they slide as the die reciprocates, and means for raising the surface to raise the lower plungers in the die after the articles have been compressed in the holes therein between the upper and lower plungers and the upper plungers withdrawn from the holes for the purpose of ejecting the articles from the holes in the die.

3. A machine for forming articles of powdered material by compression comprising a reciprocating die formed with a plurality of rows of holes, a reciprocating carriage carrying the die, a stationary feed frame below which the carriage reciprocates and located so that the die is beneath it when the carriage is in its mid-position between the two extremes of its travel, a main driving shaft from which all parts of the machine are driven, a slotted wheel receiving intermittent motion from the main shaft, a cam rotated by the slotted wheel, a rack reciprocated by the cam, a train of gears driven by the rack and driving a second rack on the carriage, whereby the carriage is reciprocated with a dwell at each end, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, crossheads carrying the rams, vertically sliding rods carrying the crossheads, toggle mechanisms controlling the movement of the sliding rods, cams on the main driving shaft operating the toggle mechanisms for depressing each of the rams alternately when the die is stationary below it, a single set of lower plungers located in and reciprocating with the die, a surface with which the lower ends of the plungers are in contact and over which they slide as the die reciprocates, and cams on the main driving shaft to raise the said surface and the bottom plungers in the holes in the die after the articles have been compressed therein between the upper and lower plungers for the purpose of ejecting the articles from the holes in the die.

4. A machine for forming articles of powdered material by compression comprising a reciprocating die formed with a plurality of rows of holes, a reciprocating carriage carrying the die, a stationary feed frame below which the carriage reciprocates and located so that the die is beneath it when the carriage is in its mid-position between the two extremes of its travel, a main driving shaft from which all parts of the machine are driven, a slotted wheel receiving intermittent motion from the main shaft, a cam rotated by the slotted wheel, a rack reciprocated by the cam, a train of gears driven by the rack and driving a second rack on the carriage, whereby the carriage is reciprocated with a dwell at each end, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, cross heads carrying the rams, vertically sliding rods carrying the crossheads, toggle mechanisms controlling the movement of the sliding rods, cams on the main driving shaft operating the toggle mechanisms for depressing each of the rams alternately when the die is stationary below it, a single set of lower plungers located in and reciprocating with the die, a surface with which the lower ends of the plungers are in contact and over which they slide as the die reciprocates, a portion of said surface at each end thereof being separate from the remainder of said surface and cams on the main driving shaft to raise the said separate portion of the surface and the bottom plungers in the holes in the die after the articles have been compressed therein between the upper and lower plungers for the purpose of ejecting the articles from the holes in the die.

5. A machine for forming articles of powdered material by compression comprising a reciprocating die formed with a plurality of rows of holes, a reciprocating carriage carrying the die, a stationary feed frame below which the carriage reciprocates and located so that the die is beneath it when the carriage is in its mid-position between the two extremes of its travel, a main driving shaft from which all parts of the machine are driven, a slotted wheel receiving intermittent motion from the main shaft, a cam rotated by the slotted wheel, a rack reciprocated by the cam, a train of gears driven by the rack and driving a second rack on the carriage, whereby the carriage is reciprocated with a dwell at each end, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, crossheads carrying the rams, vertically sliding rods carrying the crossheads, toggle mechanisms controlling the movement of the sliding rods, cams on the main driving shaft operating the toggle mechanisms for depressing each of the rams alternately when the die is stationary below it, a single set of lower plungers located in and reciprocating with the die, a surface with which the lower ends of the plungers are in contact and over which they slide as the die reciprocates, a portion of said surface at each end thereof being separate from the remainder of said surface, cams on the main driving shaft to raise the said separate portion of the surface and the bottom plungers in the holes in the die after the articles have been compressed therein between the upper and lower plungers for the purpose of ejecting the articles from the holes in the die, two blocks with inclined upper faces supporting the surface on which the lower plungers slide and means for moving the two blocks simultaneously for adjusting the position of the said surface.

6. A machine for forming articles of powdered material by compression comprising a reciprocating die formed with a plurality of rows of holes, a reciprocating carriage carrying the die, a stationary feed frame below which the carriage reciprocates and located so that the die is beneath it when the carriage is in its mid-position between the two extremes of its travel, a chute for delivering the powdered material to the feed frame, a main driving shaft from which all parts of the machine are driven, a slotted wheel receiving intermittent motion from the main shaft, a cam rotated by the slotted wheel, a rack reciprocated by the cam, a train of gears driven by the rack and driving a second rack on the carriage, whereby the carriage is reciprocated with a dwell at each end, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, crossheads carrying the rams, vertically sliding rods carrying the crossheads, toggle mechanisms controlling the movement of the sliding rods, cams on the main driving shaft operating the toggle mechanisms for depressing each of the rams alternately when the die is stationary below it, a single set of lower plungers located in and reciprocating with the die, a surface with which the lower ends of the plungers are in contact and over which they slide as the die reciprocates, a portion of said surface at each end thereof being separate from the remainder of said surface, cams on the main driving shaft to raise the said separate portion of the surface and the bottom plungers in the holes in the die after the articles have been compressed therein between the upper and lower plungers for the purpose of ejecting the articles from the holes in the die, two blocks with inclined upper faces supporting the surface on which the lower plungers slide and means for moving the two blocks simultaneously for adjusting the position of the said surface.

7. A machine for forming articles of powdered material by compression comprising a reciprocating die formed with a plurality of rows of holes, a reciprocating carriage carrying the die, a stationary feed frame below which the carriage reciprocates and located so that the die is beneath it when the carriage is in its mid-position between the two extremes of its travel, a chute for delivering the powdered material to the feed frame, a rotary agitator at the bottom of the chute, a main driving shaft from which all parts of the machine are driven, a slotted wheel receiving intermittent motion from the main shaft, a cam rotated by the slotted wheel, a rack reciprocated by the cam, a train of gears driven by the rack and driving a second rack on the carriage, whereby the carriage is reciprocated with a dwell at each end, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, cross heads carrying the rams, vertically sliding rods carrying the crossheads, toggle mechanisms controlling the movement of the sliding rods, cams on the main driving shaft operating the toggle mechanisms for depressing each of the rams alternately when the die is stattionary below it, a single set of lower plungers located in and reciprocating with the die, a surface with which the lower ends of the plungers are in contact and over which they slide as the die reciprocates, a portion of said surface at each end thereof being separate from the remainder of said surface, cams on the main driving shaft to raise the said separate portion of the surface and the bottom plungers in the holes in the die after the articles have been compressed therein between the upper and lower plungers for the purpose of ejecting the articles from the holes in the die, two blocks with inclined upper faces supporting the surface on which the lower plungers slide and means for moving the two blocks simultaneously for adjusting the position of the said surface.

8. A machine for forming articles of powdered material by compression comprising a reciprocating die formed with a plurality of rows of holes, a reciprocating carriage carrying the die, a stationary feed frame below which the carriage reciprocates and located so that the die is beneath it when the carriage is in its mid-position between the two extremes of its travel, a chute for delivering the powdered material to the feed frame, a rotary agitator at the bottom of the chute, a main driving shaft from which all parts of the machine are driven, a slotted wheel receiving intermittent motion from the main shaft, a cam rotated by the slotted wheel, a rack reciprocated by the cam, a train of gears driven by the rack and driving a second rack on the carriage, whereby the carriage is reciprocated with a dwell at each end, a pair of vertically reciprocating rams, one arranged above the position occupied by the die when the carriage is at one end of its travel and the other above the position occupied by the die when the carriage is at the other end of its travel, a plurality of plungers carried by each ram spaced to enter the holes in the die, crossheads carrying the rams, vertically sliding rods carrying the crossheads, toggle mechanisms controlling the movement of the sliding rods, cams on the main driving shaft operating the toggle mechanisms for depressing each of the rams alternately when the die is stationary below it, a single set of lower plungers located in and reciprocating with the die, a surface with which the lower ends of the plungers are in contact and over which they slide as the die reciprocates, a portion of said surface at each end thereof being separate from the remainder of said surface, cams on the main driving shaft to raise the said separate portion of the surface and the bottom plungers in the holes in the die after the articles have been compressed therein between the upper and lower plungers for the purpose of ejecting the articles from the holes in the die, two blocks with inclined upper faces supporting the surface on which the lower plungers slide and means for moving the two blocks simultaneously for adjusting the position of the said surface, a reciprocating device for removing the compressed articles from the die after being ejected from the holes therein, and means for driving the reciprocating device from the carriage in the opposite direction to the movement of the latter.

HENRY MANNERS KERFOOT.